United States Patent
Luo

(10) Patent No.: US 9,147,109 B2
(45) Date of Patent: Sep. 29, 2015

(54) METHOD FOR ADDING BUSINESS CARD INFORMATION INTO CONTACT LIST

(75) Inventor: Xiping Luo, Shanghai (CN)

(73) Assignee: INTSIG INFORMATION CO., LTD., Shanghai (CN)

( * ) Notice: Subject to any disclaimer, the term of this patent is extended or adjusted under 35 U.S.C. 154(b) by 70 days.

(21) Appl. No.: 14/126,359

(22) PCT Filed: Aug. 5, 2011

(86) PCT No.: PCT/CN2011/078055
§ 371 (c)(1),
(2), (4) Date: Dec. 13, 2013

(87) PCT Pub. No.: WO2013/004037
PCT Pub. Date: Jan. 10, 2013

(65) Prior Publication Data
US 2014/0119662 A1    May 1, 2014

(30) Foreign Application Priority Data
Jul. 5, 2011 (CN) .......................... 2011 1 0187278

(51) Int. Cl.
*G06K 9/46* (2006.01)
*G06K 9/66* (2006.01)
*G06K 9/62* (2006.01)
*G06K 9/00* (2006.01)
(Continued)

(52) U.S. Cl.
CPC ...... *G06K 9/00456* (2013.01); *G06F 17/30247* (2013.01); *G06K 9/00483* (2013.01); *G06K 9/3258* (2013.01); *G06Q 10/10* (2013.01)

(58) Field of Classification Search
None
See application file for complete search history.

(56) References Cited

U.S. PATENT DOCUMENTS 5,465,353 A    11/1995  Hull et al.
6,061,478 A *   5/2000  Kanoh et al. .................. 382/305
(Continued)

FOREIGN PATENT DOCUMENTS

CN    1413861 A    4/2003
CN    1716234 A    1/2006
(Continued)

*Primary Examiner* — Randolph I Chu
(74) *Attorney, Agent, or Firm* — Novick, Kim & Lee, PLLC; Allen Xue

(57) ABSTRACT

Provided in the present invention is a method for determining if a business card about to be added has been present in a contact list, and the method is applicable in an electronic device having a contact list used for storing business card information of contacts. The method comprises: the electronic device acquiring a business card image of the business card about to be added, then retrieving the business card image of each prestored business card from the contact list on the basis of character information on the business card image, performing an image feature matching respectively with the business card about to be added, and selecting a candidate business card on the basis of image feature similarity; determining if the candidate business card and the business card about to be added belong to a same user; if the answer is yes, then displaying that the business card about to be added has been present in the contact list, and if the answer is no, then displaying that the business card about to be added has not been present in the contact list yet. This is used for automatic determination of whether the recognized business card has already been present in the contact list by combining character recognition result and image feature, thus solving the common problem in the prior art of user adding redundant entry to the contact list.

10 Claims, 1 Drawing Sheet

(51) Int. Cl.
    *G06F 17/30*     (2006.01)
    *G06K 9/32*     (2006.01)
    *G06Q 10/10*     (2012.01)

(56) References Cited

U.S. PATENT DOCUMENTS

| | | | |
|---|---|---|---|
| 6,816,725 B1 | 11/2004 | Lemke et al. | |
| 7,925,620 B1 * | 4/2011 | Yoon | 707/609 |
| 2007/0188596 A1 * | 8/2007 | Kenoyer | 348/14.08 |
| 2008/0134030 A1 | 6/2008 | Kansal et al. | |
| 2008/0194203 A1 | 8/2008 | Hong | |
| 2009/0171910 A1 * | 7/2009 | Sarkeshik | 707/3 |
| 2009/0181653 A1 | 7/2009 | Alharayeri | |
| 2010/0255861 A1 | 10/2010 | Raviv et al. | |
| 2011/0276602 A1 * | 11/2011 | Terada et al. | 707/784 |
| 2012/0087537 A1 * | 4/2012 | Liu et al. | 382/100 |
| 2013/0304861 A1 * | 11/2013 | Gupta et al. | 709/217 |
| 2014/0108456 A1 * | 4/2014 | Ramachandrula et al. | 707/779 |

FOREIGN PATENT DOCUMENTS

| | | |
|---|---|---|
| CN | 1778125 A | 5/2006 |
| CN | 101808046 A | 8/2010 |
| CN | 101827317 A | 9/2010 |
| CN | 101882227 A | 11/2010 |
| EP | 1796019 A1 | 6/2007 |
| JP | 3738088 B2 | 1/2006 |

* cited by examiner

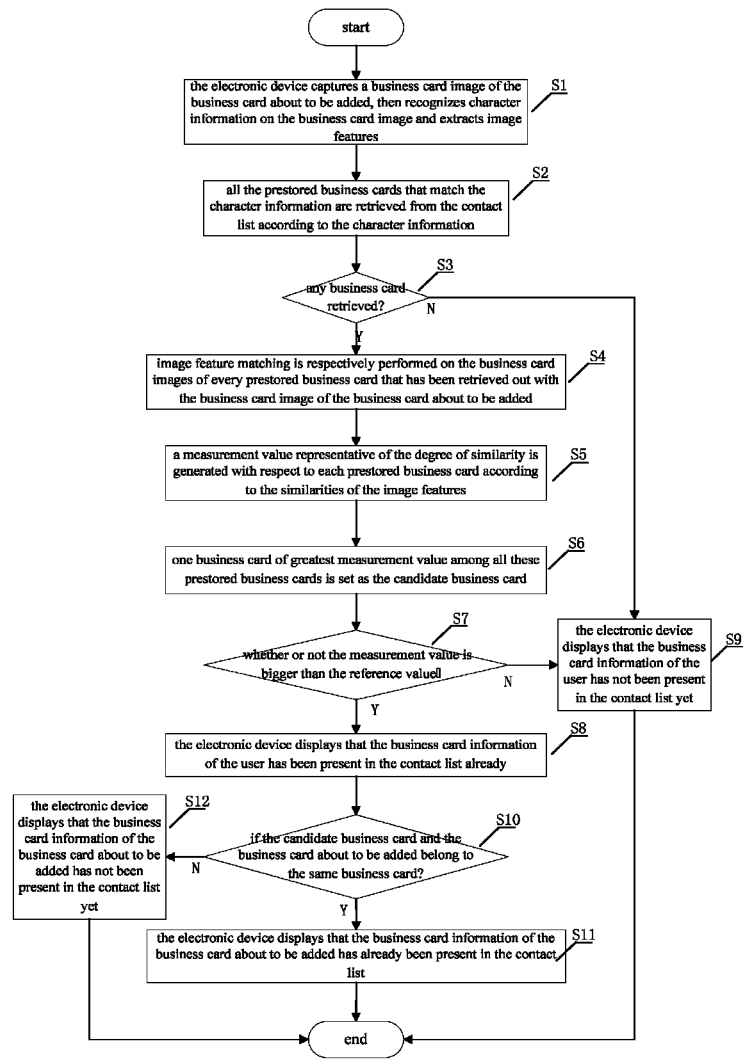

METHOD FOR ADDING BUSINESS CARD INFORMATION INTO CONTACT LIST

FIELD OF THE INVENTION

This invention relates to the technical field of character recognition and that of image processing, and especially to a method for automatically determining if the recognized business card has already been present in the contact list by combining character recognition result and image feature.

DESCRIPTION OF THE RELATED ART

Business card is a medium that people usually use to carry and deliver contact information. A lot of business cards are exchanged in daily business activities, and people communicate contact information by exchanging business cards, so as to establish communication with others.

Nowadays, the business card recognition technology widely used in cellphones and microcomputers, which uses the principles of image processing and optical character recognition (OCR, Optical Character Recognition) to automatically process and recognize the business card image obtained by digital photography or by a scanner and then automatically extracts some useful information such as name, telephone number, E-mail and so on therefrom so as to add such information into the address book, brings great convenience for those people who want to input the contact information recorded in the business card into the electronic device. For example, App store provided by the Apple company and Android market provided by the Google company sell business card recognition software such as "CamCard".

As for all the existing business card recognition software, a user operates to recognize a business card and saves it into the contact list; then, a new entry will appear in the contact list, and such entry includes the character information of the recognized business card, including name, telephone number, E-mail, company, department, job title, address, and the like, and usually includes a business card image that has been shot and has possibly been embellished. If the user inputs the same business card several times, then the procedure of generating a new contact entry will be performed several times, thus causing unnecessary duplication. The existing products fail to demonstrate any good approach to automatically determine if the recognized business card has already been present in the contact list.

An obvious way of automatically determining if the recognized business card has already been present in the contact list is to compare characters of the recognized business card with characters of the entries that have already been present in the contact list, so as to determine if it has already been there. Such method has a problem that the recognition result of the business card recognition technology based on the principle of optical character recognition can't be 100% accurate. Thus, if the character information that is obtained by optical character recognition that might contain some errors is compared with the entries that have already been saved in the contact list, reliability can't be guaranteed. For example, some people may have many business cards representative of several identities, and those business cards are consistent in terms of some contact information such as name, telephone number, email, and may only be inconsistent in terms of company name and job title. In such case, if company name and job title are not correctly recognized, then we can't make sure that business card it is according to the recognized characters. Further, for example, the business cards of some salesmen in the same company, except for the name, are the same in terms of other information such as company name, address, telephone number, email address; at this time, if characters of the name in the business card are not recognized, then we can't determine who the owner of this business card is according to those other character information.

Therefore, how to provide a method for automatically determining if the recognized business card has already been present in the contact list by combining character recognition result and image feature so as to solve all kinds of problems in the prior art, has become an urgent problem that practitioners in this technical field want to address.

SUMMARY OF THE INVENTION

In view of above deficiencies in the prior art, the object of the invention is to provide a method for determining if a business card about to be added has been present in a contact list, for automatically determining if the recognized business card has already been present in the contact list by combining character recognition result and image feature, thus solving the common problem in the prior art of user adding redundant entry to the contact list.

In order to realize above object and other relevant objects, the invention provides a method for determining if a business card about to be added has been present in a contact list, and the method is applicable in an electronic device that at least has functions of capturing business card images, recognizing character information and extracting image features, and the electronic device has a contact list used for storing business card information of contacts, characterized in that, the method comprises at least the following steps: 1) the electronic device captures the business card image of the business card about to be added, then recognizes character information on the business card image and extracts image features; 2) all the prestored business cards that match the character information are retrieved from the contact list according to the character information; image feature matching is respectively performed on every business card image of the prestored business cards that have been retrieved out with the business card image of the business card about to be added; and a measurement value representative of the degree of similarity is generated with respect to each prestored business card according to the similarities of the image features; 3) one business card of greatest measurement value among all these prestored business cards is set as the candidate business card; 4) it is determined if the candidate business card and the business card about to be added belong to the same user; and if the answer is yes, then the electronic device displays that the business card information of the user has been present in the contact list, and if the answer is no, then the electronic device displays that the business card information of the user has not been present in the contact list yet.

Wherein, the business card information in the contact list comprises the business card image and the character information. The character information includes at least one of: name, professional title, telephone number, fax number, address, post code, email address, website address, and product information on the business card.

Wherein, the electronic device presets a reference value for comparison with the measurement value, and the measurement value and the reference value are both integers.

In step 1) of the method of the invention, the electronic device captures the business card image of the business card about to be added by means of a digital photography device or a scanner device. The electronic device recognizes the character information on the business card image and extracts the image feature, by means of optical character recognition technology.

In step 4) of the method of the invention, when it is determined that the candidate business card and the business card about to be added belong to the same user, it is determined whether the measurement value is bigger than the reference value, and if the answer is yes, then the electronic device displays that the business card information of the user has been present in the contact list, if the answer is no, then the electronic device displays that the business card information of the user has not been present in the contact list yet.

In step 4) of the method of the invention, it is also determined if the candidate business card and the business card about to be added belong to the same business card, and if the answer is yes, then the electronic device displays that the business card information of the business card about to be added has been present in the contact list, if the answer is no, then the electronic device displays that the business card information of the business card about to be added has not been present in the contact list yet.

In step 2) of the method of the invention, if prestored business cards that match the character information can't be retrieved from the contact list according to the character information, the electronic device displays that the business card information of the user has not been present in the contact list yet.

In step 4) of the method of the invention, the image feature matching refers to performing matching on feature points and feature vectors corresponding to each feature point with respect to the business card image of the prestored business cards and the business card image of the business card about to be added.

As described above, the method for determining if a business card about to be added has been present in a contact list of the invention, at time of recognizing business card images, automatically determines if the recognized business card has already been present in the contact list by combining character recognition result and image feature, thus solving the common problem in the prior art of user adding redundant entry to the contact list.

BRIEF DESCRIPTION OF THE DRAWINGS

FIG. 1 is a flow chart showing steps of the method for determining if a business card about to be added has been present in a contact list.

DETAILED DESCRIPTION OF THE PREFERRED EMBODIMENTS

In the following, implements of the invention will be described in combination with some specific embodiments, and a person skilled in the art can easily understand other advantages and effects of the invention through the contents disclosed in this Description. The invention also can be implemented and applied in some other different embodiments; and modifications and alternatives can be made without departing from the spirit of the invention, to respective item of the details disclosed in this Description, based on different point of views and different applications.

Referring to FIG. 1, which is a flow chart showing steps of the method for determining if a business card about to be added has been present in a contact list, it should be noted that, illustrations provided in the present embodiment only schematically explain the basic concept of the invention, and every FIGURE only shows the elements related to the invention and is not drawn according to the number, shape and size of the elements when the invention is practiced. The pattern, type and scale of respective elements might be arbitrarily changed when the invention is practiced, and the layout of the elements may be more complicated.

As shown in the FIGURE, the invention provides a method for determining if a business card about to be added has been present in a contact list, and the method is applicable in an electronic device that at least has functions of capturing business card images, recognizing character information and extracting image features. Moreover, the electronic device has a contact list used for storing business card information of contacts. In the present embodiment, the business card information in the contact list comprises the business card image and the character information; wherein, the character information includes at least one of: name, professional title, telephone number, fax number, address, post code, email address, website address, and product information on the business card. Furthermore, with respect to the same character information, one or more business card images may be correspondingly saved in the contact list; for example, the same user may have multiple business cards, and among these business cards, only information about company name and job title is different, and other information such as name, telephone number, email address and so on are the same.

In the present embodiment, the electronic device is equipped with a digital photography device or a scanner device for capturing the business card image, and optical character recognition technology can be used to recognize the character information on the business card image and to extract the image feature. In the present embodiment, the electronic device may be an electronic device, such as a smart phone, a tablet computer, a PDA and the like, which has the function of data processing.

As shown in FIG. 1, the method for determining if a business card about to be added has been present in a contact list comprises at least the following steps:

First of all, step S1 is performed, wherein, the electronic device captures the business card image of the business card about to be added, and then recognizes character information on the business card image and extracts image features; in the present embodiment, the electronic device captures the business card image of the business card about to be added by means of a digital photography device or a scanner device, and recognizes the character information on the business card image and extracts the image feature by means of the optical character recognition technology. Then, step S2 is performed.

In step S2, all the prestored business cards that match the character information are retrieved from the contact list according to the character information; in the present embodiment, the electronic device uses the recognized character information to retrieve from the contact list. The purpose of character retrieval is to significantly reduce the number of images required to perform the image matching according to the image feature in the next step, so as to enhance the speed and matching accuracy of the image matching. The character retrieval that uses the recognized character information may specifically refer to retrieving out prestored business cards that are exactly the same as the recognized characters in terms of at least one of name, professional title, telephone number, fax number, address, post code, email address, website address, and product information of the recognized characters, from the character information of the business card prestored in the contact list. Then, step S3 is performed.

In step S3, it is determined whether or not a business card is retrieved out, if the answer is yes, the procedure proceeds to step S4, and if the answer is no, the procedure proceeds to step S9.

It should be noted that, even if the result obtained after retrieving from the contact list by the recognized character information in step S3 includes only one business card that is consistent with the characters recognized from the business card image of the business card about to be added, such business card still needs to be checked in step S4, because in some cases, the electronic device can't exclusively determine that business card stored by the contact list the character obtained by optical character recognition belong to. For example, one user may have multiple business cards, and among these business cards, only information about company name and job title is different, and other information such as name, telephone number, email address and so on are the same; in such case, if errors occur during the recognition of company name and job title, and only information such as name, telephone number, email address and so on are correctly recognized, the electronic device can't exclusively determine which of the business card those information belongs to.

In step S4, image feature matching is respectively performed on business card image of every prestored business card that have been retrieved out with the business card image of the business card about to be added; in the present embodiment, the image feature matching refers to performing matching on feature points and feature vectors corresponding to each feature point with respect to the business card image of the prestored business cards and the business card image of the business card about to be added. Then, step S5 is performed.

In step S5, a measurement value representative of the degree of similarity is generated with respect to each prestored business card according to the similarities of the image features; in the present embodiment, the electronic device presets a reference value for comparison with the measurement value, and the measurement value and the reference value are both integers. When a measurement value is bigger than the reference value, then it means that such candidate business card that corresponds to that measurement value is the business card about to be added. In other words, the bigger the measurement value, the more similar the business card that corresponds to that measurement value and the business card about to be added will be. Then, step S6 is performed.

In step S6, one business card of greatest measurement value among all these prestored business cards is set as the candidate business card, so as to ensure the accuracy of the comparison to be performed in the next step. Then, step S7 is performed.

In step S7, it is determined whether the candidate business card and the business card about to be added belong to the same user; in the present embodiment, when it is determined that the candidate business card and the business card about to be added belong to the same user, it is determined whether the measurement value is bigger than the reference value; if the answer is yes, the procedure proceeds to step S8, and if the answer is no, the procedure proceeds to step S9.

In step S8, the electronic device displays that the business card information of the user has been present in the contact list already; however, since one user may have multiple business cards, and among these business cards, only information about company name and job title is different, while other information such as name, telephone number, email address and so on are the same, the electronic device needs to prompt the operator to decide if it is necessary to determine whether or not the candidate business card and the business card about to be added belong to the same business card. Thus, the procedure proceeds to step S10.

In step S9, the electronic device displays that the business card information of the user has not been present in the contact list yet; at this time, the operator of the electronic device can decide whether or not to add this business card of the user into the contact list.

In step S10, it is determined whether the candidate business card and the business card about to be added belong to the same business card; if the answer is yes, the procedure proceeds to step S11, and if the answer is no, the procedure proceeds to step S12.

In step S11, the electronic device displays that the business card information of the business card about to be added has already been present in the contact list, so as to inform the operator of the electronic device that there is no need to add such business card over again.

In step S12, the electronic device displays that the business card information of the business card about to be added has not been present in the contact list yet; at this time, the operator of the electronic device can decide whether or not to add information of a different business card of the same user into the contact list according to his/her own demand.

In summary, the method for determining if a business card about to be added has been present in a contact list of the invention, at the time of recognizing business card images, automatically determines if the recognized business card has already been present in the contact list by combining character recognition result and image feature, thus solving the common problem in the prior art of user adding redundant entry to the contact list. Therefore, the invention overcomes the disadvantages of the prior art, and is highly valuable for industrial applications.

The embodiments described above are only used to illustrate the principle and effects of the invention rather than to limit the invention. As for a person skilled in the art, modifications and alternatives can be made without departing from the spirit and scope of the invention. Thus, all the modifications and alternatives that those skilled in the art can envisage without departing from the spirit and the technical concept of technologies as disclosed in the invention should be considered as being covered by the claims.

The invention claimed is:

1. A method for adding business card information into a contact list, comprising:
   1) capturing an image of entrant business card; recognizing character information on the image of the entrant business card; and extracting image features from the image of the entrant business card;
   2) comparing the character information in the entrant business card with a character information in all prestored business cards in the contact list to obtain one or more character-matched business cards; comparing image features of the entrant business card with image features of each of the one or more character-matched business cards; and calculating a measurement value representing a degree of similarity between the image features of the entrant business card and each of the one or more character-matched business cards;
   3) selecting a character-matched business card having a highest measurement value as a candidate business card; and
   4) determining whether the candidate business card and the entrant business card belong to a same contact; when a result of the determining step is affirmative, indicating that the entrant business card information is present in the contact list, when the result of the determining step is negative, indicating that the entrant business card information is not in the contact list;

wherein in step 2), comparing image features is to compare feature points and feature vectors corresponding to each feature point with respect to the business card images of the one or more character-matched business cards and the business card image of the entrant business card.

2. The method according to claim 1, wherein the business card information comprises image features and the character information.

3. The method according to claim 2, wherein the character information comprises at least one of name, professional title, telephone number, fax number, address, post code, email address, website address, and product information on the business card.

4. The method according to claim 1, wherein in step 1), capturing the image is carried out using a digital photography device or a scanner device.

5. The method according to claim 1, wherein in step 1), optical character recognition technology is employed to recognize the character information and to extract the image features.

6. The method according to claim 1, further comprising comparing the measurement value with a preset reference value.

7. The method according to claim 6, when the measurement value is bigger than the reference value, indicating that the entrant business card information is present in the contact list, when the measurement value is not bigger than the reference value, the entrant business card information is not present in the contact list.

8. The method according to claim 1, characterized in that: in step 4), further comprising the step of determining whether the candidate business card and the entrant business card is a same business card, when the determination is affirmative, indicating that the business card information of the entrant business card is present in the contact list, when the determination is negative, indicating that the business card information of the entrant business card is not present in the contact list.

9. The method to claim 1, when the step of comparing the character information in the entrant business card with the character information in all prestored business cards in a contact list fails to generate at least one character-matched business card, indicating that the entrant business card information is not present in the contact list.

10. The method according to claim 1, wherein in step 2), comparing image features is to compare feature points and feature vectors corresponding to each feature point with respect to the business card images of the one or more character-matched business cards and the business card image of the entrant business card.

* * * * *